US008691052B2

(12) United States Patent
Zhang et al.

(10) Patent No.: US 8,691,052 B2
(45) Date of Patent: Apr. 8, 2014

(54) CLAY SLURRIES AND USE THEREOF IN PULP AND PAPERMAKING APPLICATIONS

(75) Inventors: Fushan Zhang, Hockessin, DE (US); William S. Carey, Wallingford, PA (US); Erin A. S. Doherty, Hockessin, DE (US); John Todd Sarraf, Kennett Square, PA (US)

(73) Assignee: Hercules Incorporated, Wilmington, DE (US)

( * ) Notice: Subject to any disclaimer, the term of this patent is extended or adjusted under 35 U.S.C. 154(b) by 195 days.

(21) Appl. No.: 12/381,549

(22) Filed: Mar. 13, 2009

(65) Prior Publication Data

US 2009/0229775 A1  Sep. 17, 2009

Related U.S. Application Data

(60) Provisional application No. 61/069,463, filed on Mar. 15, 2008.

(51) Int. Cl.
*D21H 17/26* (2006.01)
*D21H 17/53* (2006.01)
*D21H 17/69* (2006.01)
*D21H 21/02* (2006.01)
*C08L 1/26* (2006.01)

(52) U.S. Cl.
USPC ..... 162/177; 162/158; 162/164.1; 162/181.8; 162/185; 524/445; 524/447; 524/451; 536/84; 106/197.01

(58) Field of Classification Search
USPC ............ 162/158, 164.1, 168.1, 177, 181.7–8, 162/185, 199; 524/442, 445, 447, 451; 536/84, 85; 106/163.01, 172.1, 197.01, 106/468–471
See application file for complete search history.

(56) References Cited

U.S. PATENT DOCUMENTS

| 4,017,324 A | 4/1977 | Eggers .................... 106/288 |
| 4,079,028 A | 3/1978 | Emmons et al. ............. 260/29.6 |
| 4,155,892 A | 5/1979 | Emmons et al. ............. 260/192 |
| 4,187,192 A | 2/1980 | Sheridan .................... 252/313 |
| 4,228,221 A | 10/1980 | Rohowetz .................... 428/469 |
| 4,871,424 A | 10/1989 | Dreisbach et al. .......... 162/168.1 |
| 5,281,654 A | 1/1994 | Eisenhart et al. ........... 524/500 |
| 5,494,509 A * | 2/1996 | Kruythoff et al. .......... 106/140.3 |
| 5,574,127 A | 11/1996 | Sau .................... 528/125 |
| 5,798,023 A * | 8/1998 | Pruszynski et al. ........ 162/181.1 |
| 6,054,511 A | 4/2000 | Angerer et al. ............. 524/42 |
| 6,074,473 A | 6/2000 | Nichols et al. ............. 106/469 |
| 6,267,811 B1 | 7/2001 | Cherukuri .................... 106/469 |
| 6,517,682 B2 * | 2/2003 | Hendriks et al. ............. 162/199 |
| 7,166,192 B2 * | 1/2007 | van de Steeg et al. ........ 162/199 |
| 7,258,732 B2 | 8/2007 | Nichols ........................ 106/469 |
| 2002/0088376 A1* | 7/2002 | Sare et al. .................... 106/486 |
| 2002/0107311 A1* | 8/2002 | Sweitzer et al. ............. 524/35 |
| 2003/0149155 A1 | 8/2003 | Lin et al. .................... 524/445 |
| 2005/0081753 A1* | 4/2005 | Nichols ........................ 106/486 |
| 2006/0122309 A1* | 6/2006 | Grah et al. ................. 524/445 |
| 2008/0029231 A1 | 2/2008 | Gu et al. ...................... 162/5 |

FOREIGN PATENT DOCUMENTS

| DE | 102 12 183 | 10/2002 |
| EP | 1 199 338 | 10/2001 |
| WO | WO2006/060716 | 6/2006 |
| WO | WO 2006/093497 A1 * | 9/2006 |

OTHER PUBLICATIONS

Machine translation of DE 10212183, The European Patent Office, [online], [retrieved on Apr. 5, 2011]. Retrieved from the Internet: <URL: http://worldwide.espacenet.com/?locale=EN_ep>.*
Hubbe et al, "Control of tacky deposits on paper machines—A review" Nordic Pulp and Paper Research Journal, vol. 21 No. 2, 2006, pp. 154-171 [online], [retrieved on Dec. 6, 2011]. Retrieved from the Internet <URL: http://repository.lib.ncsu.edu/publications/bitstream/1840.2/14/1/HubbeM_06_RV_Deposit_Control_PMs.pdf>.*
"Conversion between Stormer Viscometer Krebs Units and Viscosity Cup Drain Time" Paul N. Gardner Company, Inc., 4 pages, [online] no date [retrieved from the Internet] Retrieved Jul. 16, 2012 <URL: http://www.gardco.com/stormer_krebsconv_PU-G271.pdf>.*
"Nonylphenol Ethoxylate" Chemicalland21 [online] no date [retrieved from the Internet] Retrieved Jul. 16, 2012 <URL: http://www.chemicalland21.com/specialtychem/perchem/NONYLPHENOL%20ETHOXYLATE.htm>.*
Kirk & Othmer, Encyclopedia of Chemical Technology, (New York, New York John Wiley & Sons, Inc., 1983), vol. 22, p. 529.

* cited by examiner

*Primary Examiner* — Dennis Cordray
(74) *Attorney, Agent, or Firm* — Michael Herman; Joanne Rossi; Shaorong Chen

(57) ABSTRACT

The invention relates to a stable aqueous slurry composition comprising clay or clay-like material, hydrophobically associative polymer, and optionally a surfactant; and a method of inhibiting the deposition of organic contaminants in pulp and papermaking applications.

20 Claims, No Drawings

CLAY SLURRIES AND USE THEREOF IN PULP AND PAPERMAKING APPLICATIONS

This application claims the benefits of U.S. Provisional Applications No. 61/069,463, filed Mar. 15, 2008, the entire contents of which is herein incorporated by reference.

FIELD OF THE INVENTION

The invention relates to stable aqueous slurry comprising clay or clay-like material, hydrophobically associative polymer, and optionally a surfactant which has utility in pulp and papermaking applications.

BACKGROUND OF THE INVENTION

The deposition of organic contaminants (i.e., pitch and stickies) on surfaces in the papermaking process is well known to be detrimental to both product quality and the efficiency of the papermaking process. Some contaminating components occur naturally in wood and are released during various pulping and papermaking processes. Two specific manifestations of this problem are referred to as pitch (primarily natural resins) and stickies (adhesives or coatings from recycled paper). Pitch and stickies have the potential to cause problems with deposition, quality, and efficiency in the process as mentioned above.

The term "pitch" can be used to refer to deposits composed of organic constituents which may originate from these natural resins, their salts, as well as coating binders, sizing agents, and defoaming chemicals which may be found in the pulp. In addition, pitch frequently contains inorganic components such as calcium carbonate, talc, clays, titanium and related materials.

"Stickies" is a term that has been increasingly used to describe deposits that occur in the systems using recycled fiber. These deposits often contain the same materials found in "pitch" deposits in addition to adhesives, hot melts, waxes, and inks.

The deposition of organic contaminants, such as pitch and stickies, can be detrimental to the efficiency of a pulp or paper mill causing both reduced quality and reduced operating efficiency. Organic contaminants can deposit on process equipment in papermaking systems resulting in operational difficulties in the systems. The deposition of organic contaminants on consistency regulators and other instrument probes can render these components useless. Deposits on screens can reduce throughput and upset operation of the system. Deposition can occur not only on metal surfaces in the system, but also on plastic and synthetic surfaces such as machine wires, felts, foils, Uhle boxes and head box components.

From a physical standpoint, "pitch" deposits have usually formed from microscopic particles of adhesive material (natural or man-made) in the stock which accumulate on papermaking or pulping equipment. These deposits can readily be found on stock chest walls, paper machine foils, Uhle boxes, paper machine wires, wet press felts, dryer felts, dryer cans, and calendar stacks. The difficulties related to these deposits included direct interference with the efficiency of the contaminated surface, therefore, reduced production, as well as holes, dirt, and other sheet defects that reduce the quality and usefulness of the paper for operations that follow like coating, converting or printing.

From a physical standpoint, "stickies" have usually been particles in the stock which originate from the recycled fiber. These deposits tend to accumulate on many of the same surfaces that "pitch" can be found on and causes many of the same difficulties that "pitch" can cause. The most severe "stickies" related deposits tend to be found on paper machine wires, wet felts, dryer felts and dryer cans.

Methods of preventing the build-up of deposits on the pulp and paper mill equipment and surfaces are of great importance to the industry. The paper machines could be shut down for cleaning, but ceasing operation for cleaning is undesirable because of the consequential loss of productivity, poor quality of the paper while the machine is partially contaminated, and "dirt" which occurs when deposits break off and become incorporated in the sheet. Preventing deposition is thus greatly preferred where it can be effectively practiced.

Historically, the subsets of the organic deposit problems, "pitch" and "stickies", have manifested themselves separately, differently and have been treated distinctly and separately. This was true because mills usually used only virgin fiber or only recycled fiber. Often very different treatment chemicals and strategies were used to control these separate problems. However, current trends are for increased mandatory use of recycled fiber in all systems. This results in a co-occurrence of stickies and pitch problems in a given mill.

The use of clay and clay-like materials for controlling the deposition of organic contaminants in the pulp and paper making processes is known to those skilled in the art. For example, the use of talc in such processes is described by Kirk and Othmer, *Encyclopedia of Chemical Technology*, (New York, N.Y., John Wiley & Sons, Inc., 1983), volume 22, page 529.

The clay, or clay-like material, is usually delivered in powder form to pulp and paper mills, where it is dispersed into water to make a suspension, which is then typically fed to the pulp slurry in the papermaking systems. The use of a clay, or clay-like material, in pulp and paper mills has some drawbacks: 1) it requires capital investment for the feed and mixing equipment that is required to handle the clay, or clay-like material, powder and to disperse it into water, 2) powder can cause dust in the air which can be a health hazard, and 3) handling and feeding a powder in a make-down operation can be labor-intensive. Therefore, for the application of controlling pitch and stickies deposition in papermaking systems, it is highly desirable to have the clay, or clay-like material, in a slurry form to be delivered to pulp and paper mills.

Several factors must be considered when developing a clay, or clay-like material, slurry product for the pulp and paper industry. The slurry product must have reasonably high solids content in order to be economical. However, the viscosity of such a slurry increases exponentially with its solid content and high viscosity is not desirable for handling. Also, clay, or clay-like material, slurry without any stabilizer is unstable against sedimentation and will settle rather quickly. For example, the precipitate from clay slurry can become dense and compact and form a "hard cake" which can be rather difficult to re-disperse. Furthermore, if the slurry is intended for use for organic contaminant control in papermaking systems, it requires that all additives such as dispersant and/or suspending agents added to the clay, or clay-like material, slurry must have no detrimental effect on the function of the slurry in reducing and preventing organic deposition.

Unfortunately, most traditional dispersants or suspending agents used to disperse clay, or clay-like material, slurries such as polycarboxylates, polysulfonates, polyphosphates, sodium tripolyphosphate, sodium hexametaphosphate, sodium silicates, and the like, carry negative charges, which may reduce the affinity of clay to pitch and stickies contaminants and render the material less effective as a pitch and stickies control agent. Therefore, there is a need to prepare a clay, or clay-like material, slurry which has a high solids content, low viscosity, good stability against sedimentation, and efficacy for organic contaminant control.

An aqueous slurry of a mixture of calcined and hydrated kaolin clay (china clay) comprising a suspending agent and dispersant is taught in U.S. Pat. No. 4,017,324. It was further taught in '324 that suitable suspending agents include hydroxyethyl cellulose and methyl cellulose, suitable dispersants include non-ionic surface active agents, and the materials exhibited minimal settling after 2 to 4 weeks. U.S. Pat. No. 4,187,192 teaches that talc, unlike china clay, is relatively hydrophobic and attempts to prepare aqueous talc dispersions have not been entirely successful. It is further taught in '192 that the limitations of the prior art regarding the preparation of an aqueous talc slurry can be addressed by the use of an anionic wetting agent. U.S. Pat. No. 6,074,473 teaches that the viscosity of a talc solution in a "makedown" process can be depressed by formulation with a salt. Talc slurry resistant to foaming comprising a carboxymethyl cellulose wetting agent and an anionic polyacrylate dispersing agent are taught in U.S. Pat. No. 6,267,811 B1 to be stable for a period of a few days. The stability of the slurry of '811 can be improved by the further addition of a xanthan gum stabilizing agent. Talc slurries that are highly stable during transport and storage comprising at least one multivalent ion and a chelant are taught in U.S. Pat. No. 7,258,732 B2.

SUMMARY OF THE INVENTION

The present invention provides for compositions comprising clay or clay-like material, hydrophobically associative polymer, and optionally a surfactant.

The present invention provides for methods for inhibiting the deposition of organic contaminants, such as pitch and stickies, in pulp and papermaking systems. The method comprises adding to the pulp or applying to the surface of the papermaking machinery an effective deposition inhibiting amount of stable aqueous slurry comprising clay or clay-like material, hydrophobically associative polymer, and optionally a surfactant.

DETAILED DESCRIPTION OF THE INVENTION

The present invention relates to compositions and methods for inhibiting the deposition of organic contaminants from pulp on the surface of papermaking machinery in pulp and papermaking systems comprising adding to the pulp, or applying to the surface of the papermaking machinery, an effective deposition inhibiting amount of a stable aqueous slurry comprising clay or clay-like material, hydrophobically associative polymer, and optionally a surfactant. The present invention provides for methods for inhibiting the deposition of organic contaminants, such as pitch and stickies, from pulp and papermaking systems.

In the present invention, it has been surprisingly discovered that incorporating an effective amount of nonionic hydrophobically associative polymer (HAP) into clay, or clay-like material, slurry can significantly reduce the viscosity of the slurry and improve its stability against sedimentation.

It has been further surprisingly discovered that incorporating at least one surfactant with HAP into clay, or clay-like material, slurry can provide a synergistic effect in stabilizing the slurry against sedimentation. Thus, a stable and low-viscosity clay, or clay-like material, slurry with high solids content can be prepared by incorporating an effective amount of HAP and at least one surfactant into the slurry. The surfactant is preferably a nonionic surfactant. Since both HAP and surfactants have no detrimental effect on the function of the clay, or clay-like material, as a pitch and stickies control agent, the invented slurry compositions are useful in preventing and reducing deposition of pitch and stickies from pulp and papermaking systems.

As used in the present invention, the term "clay" or "clay-like material(s)" refers to those minerals that are comprised of basic silicates such as talc, pyrophyllite, kaolin, bentonite, montmorillonite, attapulgite, sepiolite, wollastonite, mixtures of any of the foregoing and the like. Preferably, the clay is selected from the group consisting of talc, kaolin clay, or bentonite. More preferably, the clay is talc.

The talc useful in the present invention can be any talc that is an effective pitch and/or stickies control agent. Usually such talc has a mean particle size in the range of from about 0.5 micron to 20 microns, preferably 1 micron to 10 microns, measured by SediGraph particle size analysis. Examples of talc useful in the present invention are Mistron® 100 (Luzenac America, Centennial, Colo., USA) and Vantalc® PC (R.T. Vanderbilt Company, Norwalk, Conn., USA).

The kaolin clays useful in the present invention include air-floated kaolin, water washed kaolin, delaminated kaolin, and calcined kaolin. Preferably, the kaolin clay is air-floated kaolin. Usually such kaolin clay has a mean particle size in the range of from 0.1 micron to 5 microns, preferably 0.2 micron to 2 microns, measured by SediGraph particle size analysis. Examples of kaolin useful in the present invention are Burgess No. 80 and Burgess No. 86 (Burgess Pigment Company, 5 Sandersville, Ga., USA).

The bentonite useful in the present invention includes sodium bentonite and calcium bentonite. Preferably, the bentonite is a sodium bentonite. Usually the bentonite should have cationic exchange capacity greater than 50 me/100 g. Examples of bentonite useful in the present invention are Suspengel® 325 (CIMBAR Performance Minerals, Cartersville, Ga., USA) and Bentolite® H (Southern Clay Products, Inc, Gonzales, Tex., USA).

As used in the present invention, the term "hydrophobically associative polymer" (HAP) refers to any water-soluble, or water-dispersible, polymer that contains hydrophobic groups distributed or located at sites on its polymer chains. The hydrophobic groups impart hydrophobicity to HAP polymer chains and allow them the ability to absorb onto a hydrophobic surface and/or to form intra- or inter-molecular associations through hydrophobic forces. HAPs are known in the art as rheology modifiers in paint, coating, healthcare, cosmetic, food, and pharmaceutical products.

One group of HAP are hydrophobically modified cellulose ethers such as hydrophobically modified carboxymethyl cellulose (HMCMC), hydrophobically modified hydroxyethyl cellulose (HMHEC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), mixtures of any of the foregoing and the like. Preferably the hydrophobically modified cellulose ether is hydrophobically modified hydroxyethyl cellulose (HMHEC).

HMHEC is a general descriptor of a family of chemical compounds that are based on hydroxyethyl cellulose (HEC) substrate and differ by what n-alkyl moieties are attached, the amount of hydrophobes, as well as the type of linkage between the cellulose substrate and the attached moiety. HMHEC is usually prepared from HEC by chemically incorporating a hydrophobic n-alkyl moiety generally having from 2 to more than 24 carbon atoms, preferably from 8 to 24 carbons, onto the HEC. The hydrophobically modified hydroxyethyl cellulose (HMHEC) prior to hydrophobic modification can have a degree of polymerization of about 75 to 1800. In another embodiment of the invention the hydrophobically modified hydroxyethyl cellulose (HMHEC) has hydrophobes between 10 and 24 carbon atoms in length. In yet another embodiment of the invention the hydrophobically modified hydroxyethyl cellulose (HMHEC) has hydrophobes between 8 and 20 carbon atoms in length. The hydrophobe can be linear or branched and is typically attached via an ester or ether linkage. The amount of hydrophobe incorporated will be dependent upon the intended use. The chemical and physical characteristics of HMHEC are determined by the number of carbon atoms in the hydrophobe, amount of hydrophobes, as well as the type of linkage that connects the hydrophobe to the HEC substrate.

The compositions disclosed in U.S. Pat. Nos. 4,228,277 and 6,054,511 are illustrative of HMHEC compounds. In one embodiment of the invention a preferred HMHEC is comprised of an ether linkage and a nominal $C_{16}$ hydrophobe.

Another group exemplary of HAP are copolymers of vinyl alcohol and vinyl alkonate (PVA/A). PVA/A is a general descriptor of a family of polymeric compounds based on having hydroxyl groups pendent to the polymer backbone which also contain some hydrophobic groupings such as acetate, propionate, butyrate, oleate and the like, but should not contain so much hydrophobic groupings as to render the polymeric material water-insoluble or water-indispersible. The PVA/A polymeric materials can have molecular weight ranges from about 1,000 to 250,000 or greater. These compounds are typically prepared from polymers or copolymers which yield the hydroxyl group on hydrolysis. The PVA/A which have been found most suitable in accordance to the present invention are those derived from poly[vinyl acetate] which have been from 50% to upwards of 100% hydrolyzed. The compositions disclosed in U.S. Pat. No. 4,871,424 are illustrative of the PVA/A compounds.

In one embodiment of the invention the HAP is a vinyl alcohol polymer containing hydrophobic groups is derived from polyvinyl acetate which has been 70-99% hydrolyzed and has the molecular weight from about 2,000 to 125,000.

In one embodiment of the invention the preferred PVA/A is derived from poly[vinyl acetate] with a nominal molecular weight of 100,000 and from about 80% of the acetate groups have been hydrolyzed to hydroxyl groups. An example of a PVA/A of the present invention is DeTac® DC3970 (Hercules Incorporated, Wilmington, Del., USA).

Also illustrative of HAP are hydrophobically modified poly[ethylene glycol] (HMPEG) composition comprising the formula:

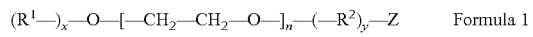

$$(R^1-)_x-O-[-CH_2-CH_2-O-]_n-(-R^2)_y-Z \quad \text{Formula 1}$$

wherein $R^1$ and $R^2$ are a hydrophobic moiety, or blocks of hydrophobic moieties of x and y repeat units, covalently bonded to poly[ethylene glycol]; n is 2 to 1200; x is 1 to 10; y is 0 to 10; Z is only present when y=0 and is hydrogen; the sum of x and y is greater than or equal to 2.

The hydrophobic moieties $R^1$ and $R^2$ of Formula 1 are formed after reaction of a poly[ethylene glycol] with a hydrophobic reagent known to those skilled in the art to be reactive with a primary alcohol. The hydrophobic reagent can be linear or branched, saturated or unsaturated, aliphatic or aromatic hydrocarbon radicals having from 2 to 100 carbon atom, or mixtures thereof. Exemplary compounds encompassed by $R^1$ and $R^2$ include, but are not limited to, alkenyl succinic anhydrides, such as n-octenylsuccinic anhydride; alkyl ketene dimers, such as lauryl ketene dimer; alkyl halides such as 2-ethylhexyl bromide; epoxides such as 1,2-epoxyhexane and 1,2-epoxydodecane; glycidyl ethers such as dodecyl glycidyl ether, 2-ethylhexyl glycidyl ether, butyl glycidyl ether, and 2-methyl phenyl glycidyl ether; carboxylic acids and their related acid chlorides or esters such as oleic acid, oleoyl chloride, and oleic acid methyl ester; mixtures of any of the foregoing and the like.

Other materials exemplary of HAP include hydrophobically modified ethoxylated urethane (HEUR) block copolymers such as those disclosed in U.S. Pat. Nos. 4,079,028, 4,155,892, and 5,281,654; and hydrophobically modified poly(acetal-polyethers) such as that described in U.S. Pat. No. 5,574,127.

In a preferred embodiment of the invention the HAP are those which themselves are effective compounds for inhibiting the deposition of organic contaminants from pulp and in pulp and papermaking systems. Representative examples of preferred hydrophobically modified cellulose ethers, PVA/A and HMPEG are disclosed in European Pat. Appl. No. 0568229 A1, U.S. Pat. No. 4,871,424, and U.S. Pat. Appl. Pub. No. 2008/0029231 A1; respectively. Within this preferred embodiment the HAP is preferably a HMHEC such as Natrosol® Plus 330PA (Hercules Incorporated, Wilmington, Del., USA).

Surfactants of the invention when present include alkyl polysaccharides, alkyl amine ethoxylates, amine oxides, alkanolamines, poly(oxyethylene-co-oxypropylene) block copolymers, acetylenic diols, castor oil ethoxylates, fatty alcohol ethoxylates, fatty acid ethoxylates, alkylphenol ethoxylates, ethoxylated alkanolamides, ethylene glycol esters, fatty acid alkanolamides, sorbitan ester ethoxylates, tall oil fatty acid ethoxylates, tallow amine ethoxylates, mixtures thereof and the like. Preferably the surfactant is nonionic. Most preferred are nonionic surfactants selected from the group of fatty alcohol ethoxylates. The surfactants of the present invention have a Hydrophilic/Lipophilic Balance (HLB) in range from about 2 to 20; preferably, the HLB value is in the range of 6 to 18. An example of a preferred surfactant of the present invention is fatty alcohol ethoxylates such as Surfonic® L24-12 or Surfonic® DA-6 (Huntsman Petrochemical Corporation, The Woodlands, Tex., USA).

The slurry of the present invention can optionally comprise a surfactant. The surfactant of the present invention can optionally be in the aqueous slurry in the range of about between 0.5 parts to 10 parts by weight per 100 parts of clay mineral; preferably, the surfactant is in the range of between 1 part to 8 parts by weight per 100 parts of clay mineral, more preferably, the surfactant is in the range of between 1 part to 6 parts by weight per 100 parts of clay mineral. Preferable the surfactant is non-ionic The aqueous clay (and/or clay-like material), HAP, and optionally nonionic surfactant of the slurries of the present invention are used in an amount effective to inhibit the deposition of organic contaminants of such as pitch and stickies. The amount and ratio of aqueous clay and/or clay-like material, HAP, and optionally nonionic surfactant useful in the present invention varies dependent on the source of the cellulosic fiber and operational parameters of the papermaking system. Additionally the slurry must be able to be delivered in an economical and practical means with regard to stability and handling characteristics.

In one embodiment of the invention the aqueous slurry comprises from about 0.1-10.0 parts HAP to about 100 parts clay or clay-like material, preferably from about 0.4-10.0 parts HAP to about 100 parts clay or clay-like material, by weight and optionally from about 0.0-20.0 parts nonionic surfactant to 100 parts clay or clay-like material, by weight, preferably 0.1-10.0 parts nonionic surfactant to 100 parts clay or clay-like material. The aqueous slurry can comprise from about 0.8-6.0 parts HAP to 100 parts clay or clay-like material, by weight. The aqueous slurry can comprise from about 0.5-10.0 parts surfactant to 100 parts clay or clay-like material, by weight, preferably from about 1.0-8.0 parts, more preferably from about 1.0-6.0 parts surfactant to 100 parts clay or clay-like material by weight.

In another embodiment of the invention the aqueous slurry comprises from about 0.8-6.0 parts HAP to 100 parts clay or clay-like material, by weight and from about 1.0-6.0 parts nonionic surfactant to 100 parts clay or clay-like material by weight.

In another embodiment of the invention the aqueous slurry comprises hydrophobically modified cellulose ether in a ratio of hydrophobically modified cellulose ether to clay or clay-like material of from 0.1 part to 10 parts hydrophobically modified cellulose ether per 100 parts clay or clay-like material, by weight. Preferably the ratio is from 0.4 part to 10 parts hydrophobically modified cellulose ether per 100 parts clay or clay-like material, by weight.

In yet another embodiment of the invention the aqueous slurry comprises from about 0.8-6.0 parts HMHEC to 100 parts talc, all weight and from about 1.0-6.0 parts fatty alcohol ethoxylates nonionic surfactant to 100 parts talc, all weight.

The aqueous slurries of this invention can have a concentration of clay or clay-like material from about 20% to 75% by weight. In one embodiment of the invention the weight percent of clay or clay-like material in the aqueous slurries of the present invention range from 20% up to 65%. Preferably the weight percent of clay or clay-like material in the aqueous slurries of the present invention range from 30% to 60%. Most preferably the weight percent of clay or clay-like material in the aqueous slurries of the present invention range from 40% to 50% by weight.

The aqueous slurries of the present invention provide for compositions that have good stability against settling and are easily pumpable by conventional means. Viscosities of less than 4000 centipoise, for the purposes of this invention, are considered to be relatively low viscosity and are easily pumpable, preferably less than 3000 cps.

The present invention provides for a method for inhibiting the deposition of organic contaminants in pulp and papermaking systems comprising the step of adding to the pulp or applying to the surface of the papermaking machinery an effective deposition inhibiting amount of a stable aqueous slurry, wherein the slurry comprises a) at least one clay or clay-like material, b) at least one hydrophobically associative polymer, and optionally c) at least one surfactant.

The amount of aqueous slurry of the present invention typically effective at controlling the deposition of organic contaminants in pulp and papermaking systems can range from about 0.1 to 20,000 ppm as slurry per ton of pulp on a dry basis.

According to the present invention, the invented slurries are effective at controlling the deposition of organic contaminants in pulp and papermaking systems. The term "pulp and papermaking" systems is inclusive of all pulp and paper production operations which may include Kraft, acid sulfite, mechanical pulp, recycled fiber systems, and the like. For example, deposition in the brown stock washer, screen and decker systems in Kraft papermaking systems. The slurries of the invention can be added to the pulp at any stage of the papermaking system. Furthermore, the slurry may be added to the papermaking system along with other papermaking additives including other pitch control agents, such as cationic polymers and proteins; fillers, such as titanium dioxide; starch; sizing aids, such as alkenylsuccinic anhydrides and ketene dimers; retention and drainage aids; and the like. Generally, it is thought that the talc slurry of the present invention can be utilized to prevent deposition on all surfaces from the beginning of the pulp mill to the reel of the paper machine under a variety of operation conditions, such as consistency, pH, temperature, conductivity of the fiber slurry, and so on.

The present invention will now be described with reference to a number of specific examples that are to be regarded as illustrative and not restricting the scope of the present invention.

EXAMPLES

The following raw materials were utilized in these examples.

The HAP polymers were Natrosol® Plus 330PA (Hercules Incorporated, Wilmington, Del., USA), a hydrophobically modified hydroxyethyl cellulose (HMHEC) powder; Bermocoll® EHM 300 (Akzo Nobel Functional Chemicals AB, Stenungsund, Sweden), a hydrophobically modified ethyl hydroxyethyl cellulose (HMEHEC) powder; PTV D-37392 (Hercules Incorporated, Wilmington, Del., USA), a hydrophobically modified poly[ethylene glycol (HMPEG); and DeTac® DC3970 (Hercules Incorporated, Wilmington, Del., USA), an aqueous solution of 9 wt % copolymers of vinyl alcohol and vinyl acetate (PVA/A).

The clay or clay-like materials were Vantalc® PC (R.T. Vanderbilt Company, Norwalk, Conn., USA), a talc with a particle size of about 2.3 micron; Burgess No. 80 (Burgess Pigment Company, 5 Sandersville, Ga., USA), an air-floated kaolin clay with particle size of about 0.4 micron; and Bentolite H (Southern Clay Products, Inc, Gonzales, Tex., USA), a bentonite find powder.

The surfactants were Surfonic® L24-12 (Huntsman Petrochemical Corporation, The Woodlands, Tex., USA), an alkoxylated alcohol with HLB value of 14.4; Surfonic® DA-6 (Huntsman Petrochemical Corporation, The Woodlands, Tex., USA), an alkoxylated alcohol with HLB value of 12.5; Tween 85 (Sigma-Aldrich, Milwaukee, Wis., USA), a polyethylene glycol sorbitan trioleate with HLB value of 11; Pluronic L92 (BASF Corporation, Mount Olive, N.J., USA), a poly(oxyethylene-oxypropylene) with HLB value of 6; Surfynol® 104E (Air Products and Chemicals, Inc., Allentown, Pa., USA), an acetylenic diol with HLB value about ~4; and Alpamine N41 (HLB~10, Arkema, La. Chambre, France), an alkanolamine with HLB~10.

The weight percent of components in the examples is based on total slurry weight unless otherwise noted.

Examples 1-5

To aqueous solutions containing various amount of Natrosol® Plus 330PA was charged Vantalc® PC with mixing to yield a 40% by weight talc content. The viscosities of the resulting slurries were measured using Brookfield DV-1 Plus Viscometer equipped with LV3 spindle at ~25° C. The samples were then subjected to an accelerated stability test wherein aliquots were centrifuged at 1,300 g centrifugal force for 10 minutes. Afterwards the volume of the supernatant was measured. The sediment stability was measured as the percentage of supernatant volume relative to the total slurry volume. A lower percentage of supernatant volume indicates more stable slurry. The results of this testing, benchmarked against a control absent of Natrosol® Plus 330PA, are summarized in Examples of 1-5 of Table 1.

TABLE 1

| Example | Natrosol ® Plus 330PA, wt % | Viscosity cps | Sediment stability, % |
|---|---|---|---|
| Control | 0.00 | 1,142 | 56.9 |
| 1 | 0.38 | 280 | 50.0 |
| 2 | 0.45 | 155 | 50.0 |
| 3 | 0.53 | 75 | 43.3 |
| 4 | 0.60 | 120 | 26.7 |
| 5 | 0.68 | 295 | 31.7 |

As can be seen from this set of experiments in Table 1, the viscosity of the all the talc slurries containing the HAP Natrosol® Plus 330PA were lower than the control which was prepared absent of Natrosol® Plus 330PA. It was further noted in these examples that a viscosity minimum was observed at 0.53% by weight HAP Natrosol® Plus 330PA (Example 3).

Examples 6-8

For examples 6-8, the talc slurries were prepared as follows. Vantalc® PC was added to deionized water with mixing to yield 40% by weight talc content. To aliquots of this slurry was then added Natrosol® Plus 330PA and/or Surfonic® L24-12 with mixing. The viscosities of the resulting samples were measured using a Brookfield DV-1 Plus Viscometer equipped with the LV3 spindle at ~25° C. The samples were then subjected to an accelerated stability test wherein aliquots were centrifuged at 1,300 g centrifugal force for 10 minutes. After centrifugation, the volume of the supernatant was measured. The sediment stability was measured as described previously. The result of this testing, benchmarked against a control of 40% by weight Vantalc® PC in water, is summarized in Table 2.

TABLE 2

| Example | Natrosol ® Plus 330PA, wt % | Surfonic ® L24-12, wt % | Viscosity cps | Sediment stability, % |
|---|---|---|---|---|
| Control | 0.0 | 0.00 | 800 | 56.9 |
| 6 | 0.5 | 0.00 | 49 | 52.5 |
| 7 | 0.0 | 0.40 | 5100 | 56.9 |
| 8 | 0.5 | 0.40 | 360 | 8.3 |

As shown in Table 2, the HAP Natrosol® Plus 330PA and surfactant Surfonic® L24-12 in themselves provided little to no improvement in slurry stabilization relative to the control (Examples 6 and 7, respectively). The combination of HAP and surfactant in Example 8 exhibited a significant increase in sediment stability as evidenced by the substantially lower supernatant volume.

Example 9

To 4,340 pounds of deionized water was added 37 pounds of Natrosol® Plus 330PA with mixing using an overhead mixer. To this mixture, 2,960 pounds of Vantalc® PC was introduced and dispersed using an Admix Fastfeed™ (Admix, Manchester, N.H., USA) powder dispersing system over 180 minutes. Finally, 59.2 pounds of Surfonic® L24-12 and a biocide package was added to the slurry. The long term stability of the finished product was tested as follows. Aliquots of ~160 grams of the finished product was added to a 4 oz jar which were then left to stand at room temperature for 34 days or at 50° C. for 7 days. At the end of the test period, the solid content of the slurry on the bottom of the jar was analyzed and compared to the initial solid content of the slurry. The change in solid content was used to evaluate the long term stability of the slurry. A small change in solid content indicates a more stable slurry. The result of this testing is summarized in Table 3.

TABLE 3

| Testing temperature | Testing duration, days | Initial solid content, % | Final solid content, % | Change in solid content, % |
|---|---|---|---|---|
| Room temperature | 34 | 41.0 | 42.3 | 3.2 |
| 50° C. | 7 | 41.0 | 40.9 | ~0 |

As indicated by the results shown in Table 3, the talc slurry of the present invention (Example 9) exhibited very good long term stability against sedimentation.

Example 10

In this example, the talc slurry of the present invention prepared in Example 9 was tested in comparison to Vantalc® PC in an organic contaminant deposition test. The test was carried out as follows. A Nashua 322-2" Aluminum Foil Tape (Covalence Adhesive, Franklin, Mass., USA) was selected to represent organic contaminants in papermaking system. The tape was applied to the bottom surface of a 162×38×9 mm brass bar comprising ten 9 mm diameter openings. Thus, the openings had their bottoms sealed by the tape and were able to hold a solution or slurry of a sample to be tested. The slurries of the materials to be tested were diluted with deionized water to the concentrations of 200 ppm and 400 ppm as talc by weight. A 250 µl aliquot of the diluted slurries was added to the openings of the bar. Of the ten openings available, four were charged with the diluted slurries of Example 9, another four with the diluted slurries of Vantalc® PC, and two with deionized water. The bar was then was shaken on a shaker (KS125, IKA Labortechnik, Germany) at 400 mot per minute for 15 minutes. A TA.TX Plus Texture Analyzer (Texture Technologies Corp. Scarsdale, N.Y. 10583) was then employed to measure tack force of the tape at the bottom of each opening of the brass bar at 500 g applied force. The smaller the tack force means the less tackiness of the tape, which suggests better capability in preventing stickies deposition. The test results are summarized in Table 4 and are the averages of the measurements for each testing sample.

TABLE 4

| Testing Material | 200 ppm Talc | 400 ppm Talc |
|---|---|---|
| Deionized water | 1407 | 1245 |
| Example 9 | 202 | 118 |
| Vantalc PC ™ | 880 | 531 |

As can be seen in Table 4, for each given concentration of talc the slurry of Example 9 has a much lower average tack force (g) than those treated with Vantalc® PC slurry. This suggests that the talc slurry of the present invention is much more effective than talc alone in preventing deposition of organic contaminants in papermaking systems.

Examples 11-21

For Examples 11-21 the talc slurries were prepared as follows. To aqueous solutions comprising the HAP PTV D-37392 (HMPEG) and surfactant Surfonic® DA-6 was charged Vantalc® PC with mixing to yield either a 40% or 50% by weight talc content. The viscosities of the resulting slurries were measured using Brookfield DV-1 Plus Viscometer equipped with LV3 spindle at ~25° C., and their settling stabilities were observed visually after being allowed to sit for 7 days at ambient condition. The results are summarized in Table 5. As can be seen, Examples 16 to 21 have relatively low viscosity and good stability against settling.

TABLE 5

| Example | Talc, wt % | HMPEG wt % | Surfonic® DA-6, wt % | Viscosity cps. | Settling |
| --- | --- | --- | --- | --- | --- |
| 11 | 40 | 1.05 | 0.53 | 10 | Yes |
| 12 | 40 | 1.20 | 0.60 | 38 | Yes |
| 13 | 40 | 1.35 | 0.68 | 88 | Yes |
| 14 | 40 | 1.50 | 0.75 | 108 | Slightly |
| 15 | 40 | 1.80 | 0.90 | 184 | Slightly |
| 16 | 40 | 2.10 | 1.05 | 348 | No |
| 17 | 40 | 2.40 | 1.20 | 684 | No |
| 18 | 40 | 3.00 | 1.50 | 2192 | No |
| 19 | 50 | 1.20 | 0.60 | 236 | No |
| 20 | 50 | 1.50 | 0.75 | 884 | No |
| 21 | 50 | 1.80 | 0.90 | 2320 | No |

Examples 22-24

For Examples 22-24 the talc slurries were prepared as follows. To solutions of the HAP DeTac® DC3970 was charged a surfactant, Surfynol® 104E or Pluronic® L92, and then Vantalc® PC was added to the mixtures with mixing to yield 40% by weight talc content. After which, a small amount of xanthan gum Vanzan® (R.T. Vanderbilt Company, Inc., Norwalk, Conn.) was added to the slurries with mixing. The samples were characterized as described for Examples 11-21. The results summarized in Table 6 indicate all three examples have relatively low viscosity and good stability against settling.

TABLE 6

| Example | PVA/A | Surfactant | Stabilizer | Viscosity cps | Settling |
| --- | --- | --- | --- | --- | --- |
| 22 | 0.9 wt % | 2 wt % Surfynol® 104E | 0.1 wt % Vanzan® | 792 | No |
| 23 | 1.8 wt % | 2 wt % Surfynol® 104E | 0.1 wt % Vanzan® | 1184 | No |
| 24 | 0.9 wt % | 1 wt % Pluronic® L92 | 0.1 wt % Vanzan® | 1380 | Very Slight |

Examples 25-27

For Examples 25-27, the talc slurries were prepared as described for Examples 22-24 utilizing the HAP Bermocoll® EHM and the surfactant Surfonic® L24-12. The samples were characterized as described for Examples 11-21. The results summarized in Table 7 indicate all three examples have relatively low viscosity and good stability against settling.

TABLE 7

| Example | Bermocoll® EHM 300, wt % | Surfonic® L24-12, wt % | Viscosity cps | Settling |
| --- | --- | --- | --- | --- |
| 25 | 0.40 | 1.20 | 887 | Slightly |
| 26 | 0.50 | 1.20 | 1960 | No |
| 27 | 0.60 | 1.20 | 2012 | No |

Examples 28-30

For Examples 28-30 the talc slurries were prepared as described for Examples 22-24 utilizing the HAP Natrasol® Plus 330 PA and the surfactant Tween 85, and switching the order of addition for the HAP and surfactant. The samples were characterized as described for Examples 11-21. The results summarized in Table 8 indicate all three examples have relatively low viscosity and good stability against settling.

TABLE 8

| Example | Natrasol® Plus 330PA, wt % | Tween 85 wt % | Viscosity cps | Settling |
| --- | --- | --- | --- | --- |
| 28 | 0.50 | 0.40 | 744 | Slightly |
| 29 | 0.50 | 0.80 | 1404 | No |
| 30 | 0.50 | 1.20 | 2593 | No |

Examples 31-36

Examples 31-36 were prepared as described for Examples 11-21 except a 15% by weight solution of sodium chloride (ACS reagent grade, Sigma-Aldrich, Milwaukee, Wis., USA) in deionized water was used as the solvent and the talc component was substituted with 30 wt % by weight of Bentolite® H bentonite fine powder. The samples were characterized as described for Examples 11-21. The results summarized in Table 9 indicate all four examples have relatively low viscosity and good stability against settling.

TABLE 9

| Example | NaCl wt % | HMPEG wt % | Surfonic® DA-6, wt % | Viscosity cps | Settling |
| --- | --- | --- | --- | --- | --- |
| 31 | 15 | 0.45 | 0.23 | 2204 | No |
| 32 | 15 | 0.60 | 0.30 | 1796 | No |
| 33 | 15 | 0.75 | 0.38 | 1592 | No |
| 34 | 15 | 0.90 | 0.45 | 1504 | No |

Examples 35-36

For examples 35-36 were prepared as described for Examples 11-21 except the surfactant used was Alpamine N41™ and the talc component was substituted with 40 wt % by weight of kaolin clay Burgess No. 80. The samples were characterized as described for Examples 11-21. The results summarized in Table 10 indicate both examples have relatively low viscosity and good stability against settling.

TABLE 10

| Example | HMPEG wt % | Alpamine N41 ™ wt % | Viscosity cps | Settling |
|---|---|---|---|---|
| 35 | 2 | 1.5 | 356 | No |
| 36 | 2 | 1.0 | 192 | No |

While the present invention has been described with respect to particular embodiment thereof, it is apparent that numerous other forms and modifications will be obvious to those skilled in the art. The appended claims and this invention generally should be construed to cover all such obvious forms and modifications, which are within the true scope of the present invention.

The invention claimed is:

1. A stable, low viscosity, high solids aqueous slurry composition comprising
a) at least one clay or clay-like material selected from the group consisting of talc, pyrophyllite, kaolinite, bentonite, montmorillonite, attapulgite, sepiolite, wollastonite and mixtures thereof,
b) at least one nonionic hydrophobically associative polymer selected from the group consisting of hydrophobically modified cellulose ether, hydrophobically modified poly[ethylene glycol], hydrophobically modified ethoxylated urethane, hydrophobically modified poly(acetal-polyethers), and mixtures thereof, and
c) at least one nonionic surfactant;
wherein said clay or clay like material is present in the slurry in an amount of from 20 to 65% by weight, and
wherein said aqueous slurry has a viscosity of less than 4000 centipoise, and
wherein the ratio of nonionic hydrophobically associative polymer to clay or clay-like material is 0.1 to 10.0 parts by weight nonionic hydrophobically associative polymer per 100 parts clay or clay-like material.

2. The composition according to claim 1, wherein said clay or clay-like material is talc.

3. The composition according to claim 2, wherein the talc has a mean particle size in the range of 0.5 micron to 20 microns.

4. The composition according to claim 1, wherein said hydrophobically modified cellulose ether is selected from the group consisting of hydrophobically modified carboxymethyl cellulose (HMCMC), hydrophobically modified hydroxyethyl cellulose (HMHEC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), and hydrophobically modified carboxymethylmethyl cellulose (HMCMMC).

5. The composition according to claim 4, wherein the hydrophobically modified cellulose ether is hydrophobically modified hydroxyethyl cellulose (HMHEC).

6. The composition according to claim 5, wherein the hydrophobically modified hydroxyethyl cellulose (HMHEC) has hydrophobes between 8 and 20 carbon atoms in length.

7. The composition according to claim 4, wherein the hydrophobically modified hydroxyethyl cellulose (HMHEC) prior to hydrophobic modification has a degree of polymerization of about 75 to 1800.

8. The composition according to claim 4, wherein the hydrophobically modified poly[ethylene glycol] comprises the formula:

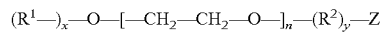

wherein $R^1$ and $R^2$ are a hydrophobic moiety, or blocks of hydrophobic moieties of x and y repeat units, covalently bonded to poly[ethylene glycol]; n is 2 to 1200; x is 1 to 10; y is 0-10; Z is only present when y=0 and is hydrogen; the sum of x and y is greater than or equal to 2.

9. The composition according to claim 1, wherein the surfactant is selected from the group consisting of alkyl polysaccharides, alkyl amine ethoxylates, amine oxides, poly(oxyethylene-oxypropylene) block copolymers, acetylenic diols, castor oil ethoxylates, fatty alcohol ethoxylates, fatty acid ethoxylates, alkylphenol ethoxylates, ethoxylated alkanolamides, ethylene glycol esters, fatty acid alkanolamides, sorbitan ester ethoxylates, and tall oil fatty acid ethoxylates.

10. The composition according to claim 1, wherein the surfactant is nonionic and comprises a fatty alcohol ethoxylate.

11. The composition according to claim 10, wherein the fatty alcohol ethoxylate has a Hydrophilic/lipophilic Balance (HLB) in range of 6 to 18.

12. The composition according to claim 1, wherein the quantity of the surfactant in the slurry composition is in the range of between 0.1 part and 20 parts by weight per 100 parts of clay or clay-like material.

13. A method for inhibiting the deposition of organic contaminants in pulp and papermaking systems comprising the step of adding an slurry to the pulp or applying the aqueous slurry to the surface of the papermaking machinery wherein the aqueous slurry comprises
a) at least one clay or clay-like material selected from the group consisting of talc, pyrophyllite, kaolinite, bentonite, montmorillonite, attapulgite, sepiolite, wollastonite and mixtures thereof,
b) at least one nonionic hydrophobically associative polymer selected from the group consisting of hydrophobically modified cellulose ether, hydrophobically modified poly[ethylene glycol], hydrophobically modified ethoxylated urethane, hydrophobically modified poly(acetal-polyethers), and mixtures thereof, and c) at least one surfactant;
wherein said clay or clay-like material is present in the slurry in an amount of from 20 to 65% by weight,
wherein the ratio of nonionic hydrophobically associative polymer to clay or clay-like material is 0.1 to 10.0 parts by weight nonionic hydrophobically associative polymer per 100 parts clay or clay-like material; and
wherein the aqueous slurry has a viscosity of less than 4000 centipoise and is added in an amount of from about 0.1 ppm to about 20,000 ppm per ton of dry pulp.

14. The method according to claim 13, wherein said clay or clay like material is talc.

15. The method according to claim 14, wherein the talc has a mean particle size in the range of 0.5 micron to 20 microns.

16. The method according to claim 13, wherein said hydrophobically modified cellulose ether is selected from the group consisting of hydrophobically modified carboxymethyl cellulose (HMCMC), hydrophobically modified hydroxyethyl cellulose (HMHPC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), and hydrophobically modified carboxymethylmethyl cellulose (HMCMMC).

17. The method according to claim 16, wherein the hydrophobically modified cellulose ether is hydrophobically modified hydroxyethyl cellulose (HMHEC).

18. The method according to claim 16, wherein the hydrophobically modified cellulose (HMHEC) prior to hydrophobic modification has a degree of polymerization of about 75 to 1800.

19. The method according to claim 13, wherein the surfactant is selected from the group consisting of alkyl polysaccharides, alkyl amine ethoxylates, amine oxides, poly(oxyethylene-oxypropylene) block copolymers, acetylenic diols, castor oil ethoxylates, fatty alcohol ethoxylates, fatty acid ethoxylates, alkylphenol ethoxylates, ethoxylated alkanolamides, ethylene glycol esters, fatty acid alkanolamides, sorbitan ester ethoxylates, and tall oil fatty acid ethoxylates and combinations thereof.

20. The method according to claim 13, wherein the quantity of the surfactant in the slurry is in the range of between 0.1 part and 20 parts by weight per 100 parts of clay mineral.

* * * * *